United States Patent
Josephs et al.

(10) Patent No.: US 9,326,028 B2
(45) Date of Patent: *Apr. 26, 2016

(54) METHODS AND APPARATUS FOR UPGRADING SET TOP BOX DEVICES WITHOUT THE LOSS OF STORED CONTENT

(71) Applicant: TIME WARNER CABLE ENTERPRISES LLC, New York, NY (US)

(72) Inventors: Hugh Josephs, Boulder, CO (US); Stephen Johnson, Eastsound, WA (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/294,083

(22) Filed: Jun. 2, 2014

(65) Prior Publication Data
US 2015/0074740 A1    Mar. 12, 2015

Related U.S. Application Data

(63) Continuation of application No. 12/098,272, filed on Apr. 4, 2008, now Pat. No. 8,745,685.

(51) Int. Cl.
| | |
|---|---|
| *H04N 21/458* | (2011.01) |
| *H04N 21/6543* | (2011.01) |
| *H04N 7/173* | (2011.01) |
| *H04N 21/2747* | (2011.01) |
| *H04N 21/426* | (2011.01) |

(52) U.S. Cl.
CPC ....... *H04N 21/4586* (2013.01); *H04N 7/17318* (2013.01); *H04N 21/2747* (2013.01); *H04N 21/42684* (2013.01); *H04N 21/6543* (2013.01)

(58) Field of Classification Search
CPC ................... H04N 21/2747; H04N 21/42684; H04N 21/443; H04N 21/4586; H04N 21/818
USPC ......................................... 725/132, 140–141
See application file for complete search history.

(56) References Cited

U.S. PATENT DOCUMENTS

| | | | |
|---|---|---|---|
| 6,052,780 A * | 4/2000 | Glover | 713/193 |
| 2002/0010689 A1* | 1/2002 | Tibbs et al. | 705/408 |
| 2002/0056112 A1* | 5/2002 | Dureau et al. | 725/78 |
| 2006/0041905 A1* | 2/2006 | Wasilewski | H04N 5/913 725/31 |
| 2007/0162502 A1* | 7/2007 | Thomas | G06F 17/3082 |
| 2008/0040767 A1* | 2/2008 | McCarthy et al. | 725/132 |
| 2009/0142036 A1* | 6/2009 | Branam et al. | 386/83 |
| 2010/0235875 A1* | 9/2010 | Cedervall | G06F 8/65 725/110 |

* cited by examiner

*Primary Examiner* — Brian T Pendleton
*Assistant Examiner* — Alan Luong
(74) *Attorney, Agent, or Firm* — Straub & Pokotylo; Michael P. Straub; Abbas Zaidi (57) ABSTRACT

Methods and apparatus for smoothly and efficiently upgrading set top boxes, e.g., personal video recorders, which have customer selected content stored thereon are described. The described methods allow content stored on a set top box to be uploaded to a network storage device, e.g., automatically at a predetermined time prior to a scheduled upgrade, or in some cases, via manual control of the set top box to be upgraded. After stored content is uploaded to the network storage device, the set top box is replaced with a new set top box. The new set top box can be preloaded with the previously uploaded content or a content download can be triggered, e.g., by activating a hidden application and by supplying information identifying the set top box being replaced as part of the upgrade process.

29 Claims, 7 Drawing Sheets

METHODS AND APPARATUS FOR UPGRADING SET TOP BOX DEVICES WITHOUT THE LOSS OF STORED CONTENT

FIELD OF THE INVENTION

The present invention relates to methods and apparatus for upgrading set top box devices, and, more particularly, to methods and apparatus for supporting efficient upgrading of STB (Set Top Box) PVR (Personal Video Recorder) devices including, e.g., digital video recorders, without the loss of user stored content.

BACKGROUND OF THE INVENTION

Set top boxes are used in the cable industry for interfacing between the cable network and various customer premise devices. For a number of years, set top boxes have been mainly used for receiving television programming and/or other content along with menu information and for providing an interface through which a customer can access the available content. For example, cable set top boxes have been used for a number of years to allow a cable service subscriber to access video and/or other content available through the network, e.g., with the content such as, for example, a television program or movie, being displayed on a television set coupled to the set top box. Older set top boxes supported relatively limited upstream data communication with the amount of available upstream bandwidth being used to support, e.g., communication of user pay-per-view content selections or other user selections or requests.

While data storage devices are becoming relatively cheap, until recently the high cost of storage devices encouraged the use of centralized network storage to implement some video recorder functions. Network based video recording devices, which could be controlled and accessed by individual cable subscribers are sometimes referred to as Network Personal Video Recorders. In such systems, a cable subscriber accesses video recording functionality through a set top box with content being stored and retrieved from a network based storage device. Older set top boxes are able to take advantage of such systems since the upstream data rate required to communicate information to the network headend where content storage and streaming functions are implemented tends to be relatively minimal.

As the cost of storage devices, e.g., hard disks, have dropped in price, customer premise based personal video recorder devices have grown in popularity. Such devices offer some advantages over network PVR devices including the ability to immediately access content without concern for network delays and/or network service interruptions due to, e.g., weather or service outages.

PVR devices have grown in such popularity that many set top boxes are now available with PVR capability built in allowing, e.g., a cable service subscriber to record TV shows and/or other content in a set top box located in their home. In fact, many cable service subscribers now have multiple set top boxes in their homes with PVR functionality.

Set top boxes with PVR capability provide the cable company the opportunity to charge a monthly service fee for the added PVR capability. Thus, for example, rental of a set top box with PVR functionality might cost a fixed amount above rental of a set top box without PVR capability. Given the potential revenue that can be generated by providing set top box PVRs, cable and other service providers have been encouraging subscribers to use an ever larger number of set top box PVRs.

As set top box PVR based use increases, the demand for network based PVR functionality is likely to decrease over time. Cable and other content providers who have deployed network based PVRs are now confronted with an increasing tendency towards STB based PVRs but still have a desire to obtain commercial advantages through the use of the existing network PVR capability in which they have already invested.

While STB based PVRs continue to grow in popularity, cable companies are faced with another problem, i.e., maintaining customer satisfaction as new STB PVR device capabilities increase and/or customers decide to upgrade to High Definition (HD) capable STB devices including HD STB based PVRs.

As a subscriber uses his/her STB based PVR over time, the subscriber's video and/or other content stored on the STB tends to grow often requiring an upgrade to a STB PVR with greater internal storage capacity. Similarly, when a user switches from a regular to an HD television there also tends to be a need to upgrade significantly in terms of the STB PVR storage capability given the vastly larger size of HD programs.

While upgrading, e.g., by replacing, STB PVRs often provides an opportunity to obtain greater revenue from increased fees associated with premium HD service and/or increased rental fees for a larger capacity STB PVR, cable companies are confronted with the relatively costly task of sending a service man out to replace the users STB PVR with a different, e.g., newer one with greater storage capacity or functionality, as part of a STB upgrade process.

For subscriber's concerned about maintaining their stored content, installation may involve the time consuming task of copying the subscriber's content to a portable data storage device and then copying it back to the replacement STB PVR. As should be appreciated, the cost of the service technician's time for such a process can be considerable particularly in cases where there is a large amount of stored content to be copied from the old STB PVR and then recorded to the new STB PVR.

In view of the above discussion, it should be appreciated that there is a need for improved ways of upgrading STB PVRs without the loss of a subscriber's previously recorded content. It would be desirable if one or more methods could be developed which could reduce or eliminate the need for a service technician's involvement in the replacement process which is performed as part of a STB upgrade or at least reduce or simplify the tasks performed by technician at the customer's premises.

SUMMARY OF THE INVENTION

Methods and apparatus for supporting efficient upgrading of STB PVR devices including, e.g., STBs including digital video recorders, without the loss of user stored content are described. Various embodiments are described which reduce the amount of time and/or operations performed by a service technician as part of a STB upgrade process in which a STB is upgraded through a replacement process. In some but not all embodiments, the need to send a technician to a customer premise to allow for the backup and storage of content on a new set top box being provided as a replacement as part of an upgrade process is eliminated entirely.

The methods and apparatus of the present invention take advantage of a set top box's ability to communicate data upstream to a headend device, such as a network based video recorder device.

In accordance with some embodiments, a service subscriber contacts the service provider, e.g., an administrative system at a cable head end, and schedules an upgrade of a STB PVR device with the STB upgrade to be achieved, e.g., through STB replacement. The new STB may include, for example, greater storage capacity and/or functionality.

In some exemplary embodiments, in order to minimize the amount of time a service technician needs to spend at the customer premise where the STB PVR to be upgraded is located, the administrative system in the headend of the communications network, e.g., cable network, controls the STB to be upgraded to upload the user stored content prior to the time the scheduled upgrade is to occur, e.g., during the night immediately preceding the day in which the STB is scheduled to be upgraded. In some such embodiments, existing Network PVR data storage capability is used to store the content being uploaded from the subscribers STB. In at least one such embodiment, by the time the service technician arrives to upgrade the STB the subscriber stored content has already been uploaded and stored, e.g., on a network storage device, with information identifying the STB being upgraded, e.g., the STB serial number, MAC address and/or some other unique STB identifier.

To complete the STB upgrade, in which an automatic upload of content is performed from the STB to be replaced as part of the upgrade, an installer replaces the old STB at the customer premise with the replacement, e.g., new, STB including PVR functionality, being provided as part of the upgrade process. In some embodiments, the replacement STB is preloaded before being installed at the customer premise with the content previously uploaded to the network storage device. In some such embodiments, the downloading of the content is performed, e.g., at the installers premises or at another location where replacement STBs are stored prior to delivery to the customer premise. The downloading may be done automatically under control of the headend with the headend then providing information, e.g., in the form of a label which can be printed, indicating the customer, customer location at which the STB to be replaced is located and/or STB to be replaced with the new STB with the downloaded content. In other embodiments, the downloading is initiated by the installer activating an installer application which is normally hidden on the STB and entering information identifying the STB to be replaced which is then communicated to the headend and network PVR to initiate the stored content download.

To reduce the risk of a STB including content corresponding to one subscriber being delivered and installed at another subscriber's customer premise, in some embodiments an installer first replaces the old STB with the new STB at the customer premises and then initiates a content downloaded via the cable network. This may be done by, for example, activating a hidden application on the STB and providing information identifying the STB being replaced as part of the upgrade process and/or customer information sufficient to identify the content to be downloaded to the STB being installed. When combined with the automatic uploading of content prior to the service person's arrival, this approach avoids wasting the service person's time while content is uploaded while avoiding the risk of a STB PVR being delivered to a customer premise with another customer's content preloaded thereon.

In cases where the STB being replaced includes a high speed modem, the installer may initiate the content upload from the STB being replaced, wait for the upload to be completed and then trigger a download of the stored content from the network storage device by sending a signal from the replacement STB. While this approach may work satisfactorily for devices with high speed modems and limited amounts of storage, the automatic uploading of content may be preferable in cases where a high speed modem is not present in the old STB for sending content up to the network recording device or where there is a large amount of content to be uploaded.

In still another embodiment which eliminates the need for a service person to visit the customer's premise, a customer schedules a STB upgrade by contacting the headend. An administrative system then scheduled the upgrade, automatically uploads the content from the STB to be replaced to a network storage device, downloads the uploaded content to the replacement STB being supplied as part of the upgrade process and then generates a label for the replacement STB, e.g., a shipping label or other label identifying the customer, customer location and/or STB to be replaced. The administrative system may then schedule delivery, e.g., shipping via an overnight or other delivery service responsible for picking up and delivering the replacement STB to the customer. In other embodiments, the STB is labeled and an installer or other individual responsible for replacing the old STB with the new labeled STB is allowed to pick up the new labeled STB and then use it to replace the old STB.

In some embodiments, the administrative or shipper's system generates, e.g., prints, a return label to be used for returning the STB being replaced in the upgrade process. In the case where a delivery service is used to ship the new STB, after the delivery service delivers the STB with the preloaded customer content, the customer can replace the old STB with the replacement STB. The old STB is then shipped back to the service provider using the return label and, optionally, the box used to deliver the replacement STB. In this manner, a customer can be supplied with a replacement STB as part of an upgrade process without the need for a service person actually visiting the customer's house or other site where the STB to be replaced is located.

Thus, in various embodiments, the methods of the present invention take advantage of a network with a administrative system and distributed servers, e.g., network PVRs and/or content servers, for supporting user device upgrade.

The methods and apparatus of the invention may be used to provide upgrade and content backup options to users with different types of set top boxes, with different interfaces and/or supporting different content transfer upload/download rates. In some embodiments users may select an upgrade method, e.g., service person implemented upgrade or self upgrade, depending on their preference and/or willingness to pay for a service person to visit their premises. Such information may be communicated to the administrative system at the time of the upgrade. In some embodiments the administrative system selects, e.g., automatically, between one or more upgrade methods based on the customer input. In other cases, a single upgrade method is supported. In still other embodiments, the administrative system takes into consideration the capabilities of the STB to be replaced, e.g., with STBs upload rate being taken into consideration when determining how much time in advance to begin a content upload and/or when determining that the service person may trigger the upload from the customer's premise, e.g., in the case where the STB being replaced includes a high speed cable modem.

It should be appreciated that all features need not be used or included in all embodiments and that a wide variety of upgrade methods are possible.

Various additional features and advantages of the present invention are discussed in the detailed description which follows.

BRIEF DESCRIPTION OF THE DRAWINGS

FIG. 6, which comprises the combination of FIGS. 4A and 4D, illustrates the signaling and steps associated with still another exemplary method where the user content is loaded onto a replacement set top box and the new upgraded STB, e.g., replacement device, is then delivered/shipped to the customer in accordance with the present invention.

DETAILED DESCRIPTION

The present invention relates to methods and apparatus for upgrading set top box devices, and, more particularly, to methods and apparatus for supporting efficient upgrading of STB (Set Top Box) PVR (Personal Video Recorder) devices including, e.g., digital video recorders, without the loss of user stored content, e.g. video and/or audio data, favorite movies, shows etc. recorded by a user of the STB.

Figure 1:
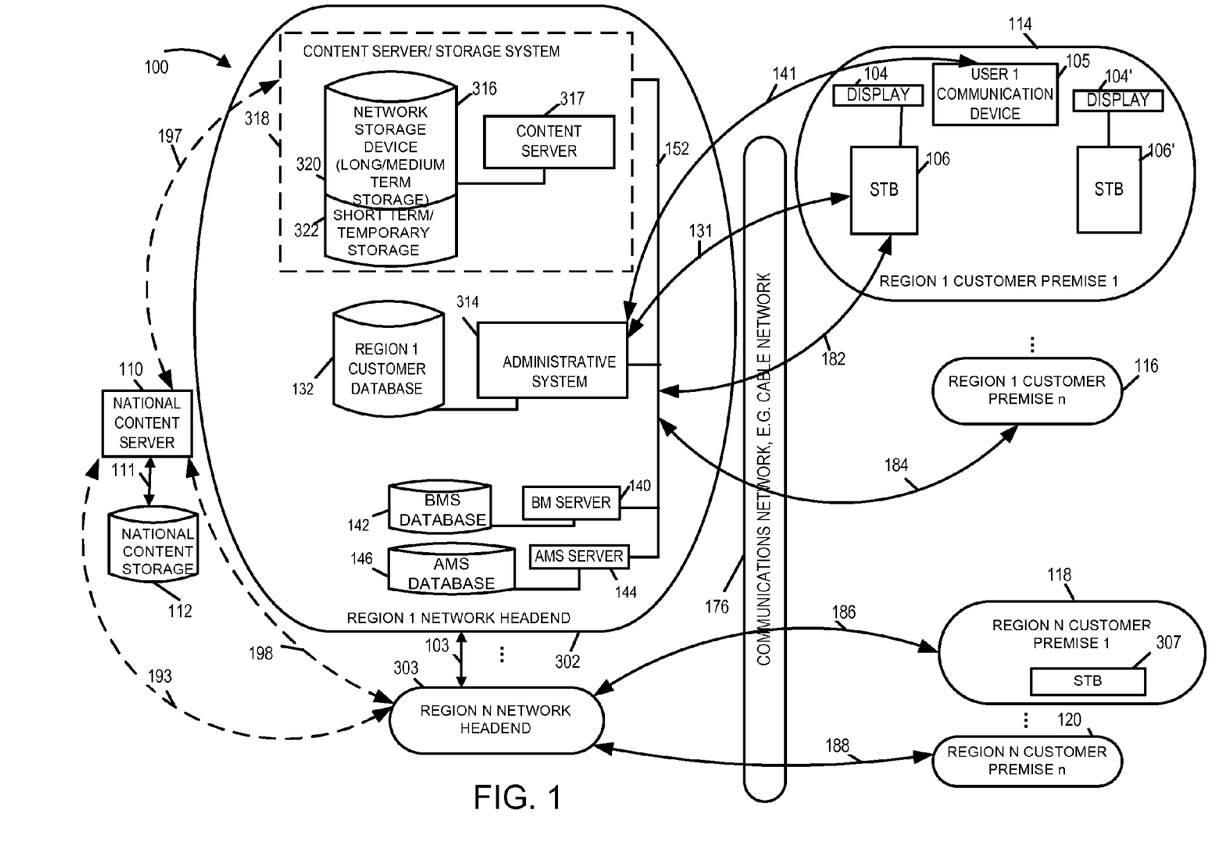
FIG. 1 illustrates an exemplary communications network implemented in accordance with the present invention.

FIG. 1 illustrates an exemplary content delivery and distribution system 100 supporting STB upgrades in accordance with the invention. The system 100 also supports the provisioning, selection, notification, communication, and billing of content to customers in accordance with various embodiments of the present invention. Exemplary system 100 includes a plurality of N regional service provider systems/Network head ends including a region 1 service provider system/Region 1 Network head end 302 and a region N service provider system/Region N Network head end 303. Each regional service provider system, e.g., region 1 service provider system 302, region N service provider system 303, has a corresponding set of customer premises region 1 customer premise 1 114, . . . , region 1 customer premise n 116, region N customer premise 1 118, . . . , region N customer premise n 120 each of which may include one or more STBs with content storage capability. System 100 also includes service provider national infrastructure including a national content server 110 with a corresponding national content storage 112.

Region 1 customer premise 1 114 includes a first set of equipment, e.g. user 1 set top box (STB) 106. In some embodiments, the STB 106 is coupled to a display device, e.g. display 104, which could be an external television as is commonly the case. However, it should be appreciated that the STB 106 can be integrated in a device which also includes the display 104. The STB 106 may, and often does, include DVR functionality and the storage of user selected content. Region 1 customer premise 1 114 also includes additional STBs and displays, e.g. STB 106' and display 104'. The customer premise may also include additional communications devices, such as user 1 communication device 105, which may be, e.g., a PC based device with a Web browser and/or a telephone system. Customers in the system 100 have accounts with the service provider which can be accessed via a Web browser contacting an administrative system 314, e.g., using communications device 105, situated at the same location or a different location from the customer's set top box. Some users may use the web browser to access their accounts to order an upgrade of their devices, e.g. upgrade of a set top box to include enhanced features or increased recording capability. It is also possible to contact the administrative system 314 via an interface on the STB 106 and schedule a STB upgrade.

Region 1 network head end 302 includes administrative system 314 which is coupled to a customer database 132. The customer database 132 is used to store customer account information, e.g., name, address, STB identification information, STB capability information, and information about which services the customer subscribes to, what upgrades are to be provided to the customer and when such upgrades, if any, are scheduled to be performed. The network head end 302 further includes a content server/storage system 318, a business management (BM) server 140, and an Accounting management server (AMS) 144. In addition to the above said elements, region 1 network head end 302 also includes a plurality of various databases (e.g., region 1 customer database 132 coupled to administrative system 314, business management server database 142 coupled to business management (BM) server 140, and Accounting management server (AMS) database 146 coupled to AMS server 144). The various servers (318, 140, 144) are coupled together via a bus 152 over which they may interchange data and information.

Region 1 customer premise 1 114 is coupled to region 1 network head end 302 via a communications network 176, e.g. a cable network. Communications link 182 traversing the service provider's cable network 176 couples set top box 106 to the region 1 network head end's bus 152. Similarly, region 1 customer premise n 116 is coupled to region 1 service provider system/region 1 network head end bus 152 via link 184 which traverses service provider cable network 176.

Region N customer premise 1 118 is coupled to region N network head end 303 via a communications link 186. Similarly, region N customer premise n 120 is coupled to region N network head end 303 via a communications link 188.

The network head ends 302, 303 of the different regions are coupled together, e.g., via link 103. Each of the network head ends (302, 303) are also coupled to the national content server 110 thereby allowing content to be passed between the network headends and the national content server 110. Link 193 indicates that region N service provider system 104 is coupled to national content server 110. The National content server 110 is coupled to National Content Storage 112, which stores content which can be delivered nationally, via link 111.

National content server 110 is coupled to Region 1 Content server/storage system 318 via link 197. Similarly national content server 110 is coupled to a Content server of region N network head end 303 via link 193. Various alternative interconnection topologies between the regional network head end and a national service provider system infrastructure are possible.

National content storage 112, typically has a greater storage capacity than the storage capacity of an individual regional content storage, e.g., region 1 Network storage device 316. Network storage device 316 includes long/medium term storage 320 and short term/temporary storage 322. Short term/temporary storage 320 includes, e.g., content uploaded from an old STB/DVR of a user who requested an upgrade. Long/medium term storage 320 includes storage of programs such as movies for which there is a high degree of anticipated demand. Long/medium term storage 320 includes, e.g., content of recent releases, content of regional favorites, content of seasonal favorites, etc. Short term/temporary storage 322 may include, in additional to content uploaded in accordance with the device upload method of the invention, storage of infrequently selected programs which do normally reside in storage 320, e.g., a customer ordered video on demand infrequently selected movie that has been recently downloaded from national content storage 112. Short term/temporarily storage 322 also includes storage of time sensitive programs, e.g., a recent weather report, a recent news report, etc. that tend to be deleted after a short period of time. While short term storage 322 is used in some embodiments to store content uploaded as part of a STB upgrade process, any portion of the network storage device 316 can be used to store the uploaded content.

The STB 106 in Region 1 customer premise 1 114 can interact and communicate with the administrative system 314 in the region 1 network head end 302 through the communications network. In the exemplary system shown in FIG. 1, the STB 106 in region 1 customer premise 1 interacts with the administrative system 314 for supporting customer ordering of services and/or content, reporting of status of ordered services, and customer account management functions. Interaction between the STB 106 and the administrative system 314 enables the user of the STB 106 to, e.g. request a STB upgrade, access other available services, place an order for on-demand content etc. It should be appreciated that for ordering a service a user is not restricted to place such an order using the STB but rather the user may order a service such as an upgrade using any one of a plurality of communications devices, e.g. through web browser by logging onto the service provider's website and/or the user may even directly call up the service provider using a user communications device 105, e.g. a telephone to schedule an upgrade.

National content server 110 processes requests for content and accesses content from national content storage 112, e.g., forwarding requested content via link 197 to content server/storage system 318, in the event when a user requests a content which is not available locally to content server/storage system 318. As shown the content server/storage system 318 includes a content server 317 which manages the network storage device 316, e.g., controlling upload and storage of content from an old STB/DVR of a user who ordered an upgrade before replacement of the old STB/DVR of the user with a new STB/DVR, and controlling restoration/delivery, e.g., downloading, of the stored content from the regional content storage to the new STB/DVR after installation of the new STB/DVR. Other functions performed by content server 317 include deleting and/or not maintaining content accessibility in response to a received command and/or a timer expiration.

Among other things, the administrative system 314 is also responsible for interacting with the user of the STB, e.g. the STB 106, for scheduling an upgrade of the STB in response to a user initiated upgrade request. In some embodiments the administrative system 314 may be implemented as an automated voice response system. In some other embodiments, the administrative system 314 is capable of supporting interaction directly with the customers, e.g. through telephone, web browser, and through the features and functionality provided in the STB 106. Among other functions, the administrative system 314 is responsive to an upgrade request and provides a user the opportunity to back up his/her data/content stored in the STB while the STB is upgraded. The administrative system 314 exchanges signaling and information with the set top box user interface of the STB 106, as shown by link 131.

Business management server 140 processes billing information corresponding to region 1 customers, e.g., updating billing charge information in response to changes in the set top box being supplied, video on demand purchases, and/or other activity. Business management server 140 also processes bill payment information, e.g., credit card transactions, deductions from debit accounts, mail bills, and/or processes discount and/or coupon information.

Figure 2:
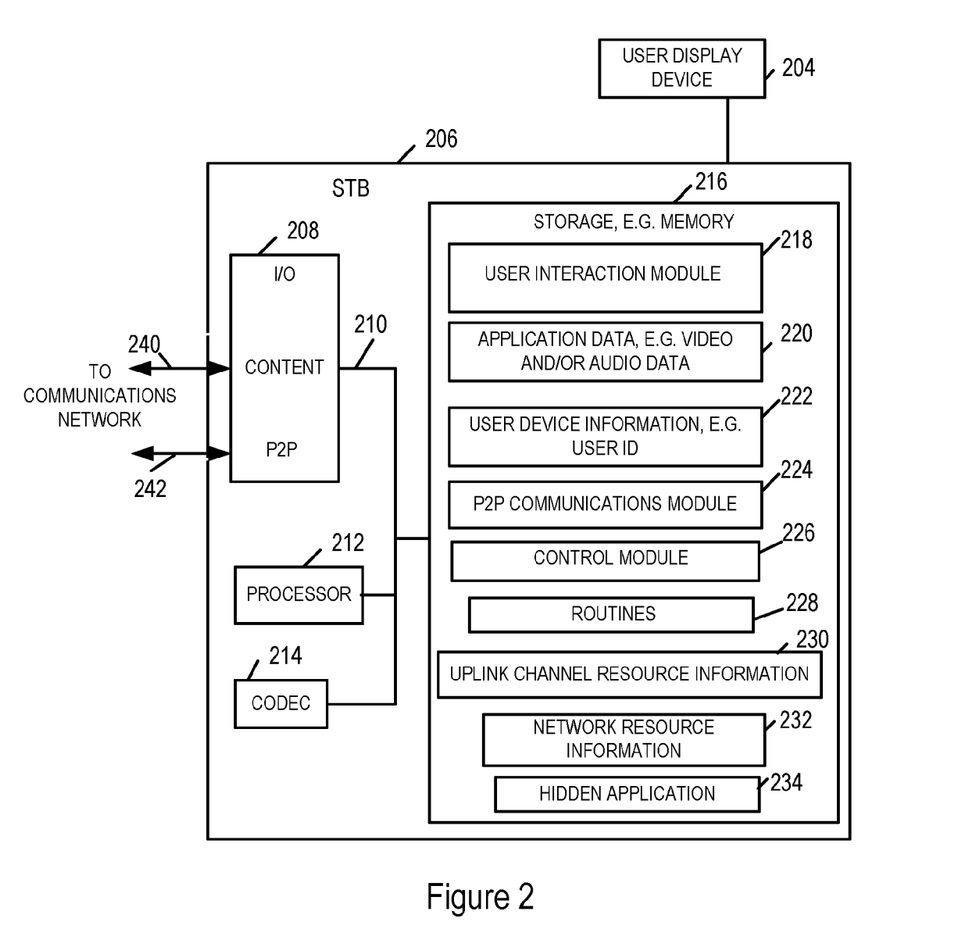
FIG. 2 illustrates an exemplary set top box which may be used in the exemplary communications network of FIG. 1.

FIG. 2 illustrates an exemplary set top box (STB) 206 implemented in accordance with one exemplary embodiment. The exemplary STB 206 may be used as any one of the STB 106, 106' of the system shown in FIG. 1. As shown, the STB 206 is coupled to a display device 204, e.g. a monitor and/or a Television (TV). The STB 206 includes an Input/Output (I/O) interface 208, a processor 212, a codec (Coder/Decoder) 214, and a storage device, e.g. a memory 216 coupled together via a bus 210. The various elements of the STB 206 can exchange data and information over the bus 210. Via the I/O interface 208, the STB 206 can exchange signals and/or information with other devices such as the administrative system 314 in the network head end 302 of region 1, via the communications network 176. The I/O interface supports the receipt and/or transmission of content to/from different servers, e.g., the content server 318 and/or national content server 110 as represented by arrow 240 and may include, in some cases, a cable modem allowing for high speed upload and downloads of data. In addition to supporting the communication of content, I/O interface 208 further supports the communication of application and/or control signals between the set top box 206 and other servers and sub-systems, e.g. administrative system as represented by arrow 242. In some embodiments, the I/O interface 208 may also support the exchange of P2P signaling, e.g. signaling between different set top boxes. In the case of an old STB to be upgraded, the STB I/O interface 208 may not include a high speed cable modem and may support only relatively low rate uplink signaling and/or communication of content stored on the STB 206.

The processor 212, e.g., a CPU, executes routines 228 stored in the memory 216 and, under direction of the routines 228, controls the STB 206 to operate in accordance with the invention. To control the STB 206, the processor 212 uses information and/or routines including instructions stored in memory 216. The Codec 214 is implemented as a module and is capable of performing encoding and/or decoding operations on a digital data stream or signal.

The memory 216 includes a user interaction module 218, application data 220, user device information 222, an optional Peer to Peer (P2P) communications module 224, control module 226, various routines 228, uplink channel resource information 230, network information and hidden application 234. Routines 228 include communications routines and/or set top box control routines.

The user interaction module 218 supports the interaction between the user of the STB 206 and the network through the STB 206 which facilitates interaction with the administrative system 314 in the network head end 302. The user interaction module 218, for example, controls presentation of a prompt to the user of the STB 206, providing the user an opportunity to signal that the user would like to utilize one or more of the services offered by the service provider, e.g. upgrading the STB/DVR.

Application data 220, e.g. video and/or audio data, can be movies, songs, shows etc. that the user may have download and/or otherwise stored on his set top box. It may include content which is being temporarily stored as part of an on demand content delivery session. In some cases the application data can be deleted under user control and/or portions of the data will automatically be deleted as part of normal system management, e.g., after it is displayed. The user device information 222 may be, e.g. a user ID, Media Access Control (MAC) address of the STB, etc. and or other information stored in the set top box memory. In various embodiments, the MAC address is used for routing content and/or control signals to/from the STB 206. Thus, in at least some embodiments, the MAC address is used by the service provider to uniquely identify different set top boxes belonging to different users. The optional P2P communications module 224 includes routines and control instructions for enabling Peer to Peer communications between the user set top box 206, one or more STB's, and in some embodiments the administrative system 314 of FIG. 1.

The uplink channel resource information module 230 includes information regarding the uplink communications channel assigned to the STB 206 for use in, e.g. uploading the data to the network content server such as the content server/storage system 318 of FIG. 1, for storage. For example, the uplink channel resource information 230 may include information regarding, e.g. a dedicated uplink channel for data upload and/or time slots for which the STB 206 may upload its content, is assigned uplink. Network resource information 232 includes information regarding the network which is serving the user of STB 206 during a period of time. It is possible that a regional service provider/network may not offer some of the services requested by a user at certain time. In such an event, the user may be served by a service provider/network of different region, and the regional service provider/network may update information regarding the different network. The network resource information also includes information regarding the services that are available to the user of the STB 206, i.e. number of channels, on-demand services etc.

The hidden application 234 may be implemented as a set of instructions stored in the set top box 206 which can be triggered by, e.g., a service professional or user through a specific set of operations. The hidden application 234 is not available from the standard menus available to a user during ordinary STB modes of operation. In some but not all embodiments, when the STB 206 is installed, e.g. after an upgrade, the installer, e.g. the user/customer himself or any other person installing the STB device, invokes this hidden application so that the device initiates and establishes contact with the network and exchanges signaling and information with the network. The signaling and information may include information such as the MAC address of the STB, information regarding the data rates that the newly installed STB can support etc. Information on identifying a STB may also be entered into the STB and communicated under control of the hidden application to the network head end. In some embodiments, the hidden application provides a security feature to authenticate the hidden application. The security feature may involve a requirement that the user enter a special code before enabling or proceeding with operations supported by the hidden application. Activation of the hidden application may involve entry of certain codes, service codes, user account information, passwords, device identifiers, etc. whose knowledge may be restricted to the authorized users and/or profession service personal.

Figure 3:
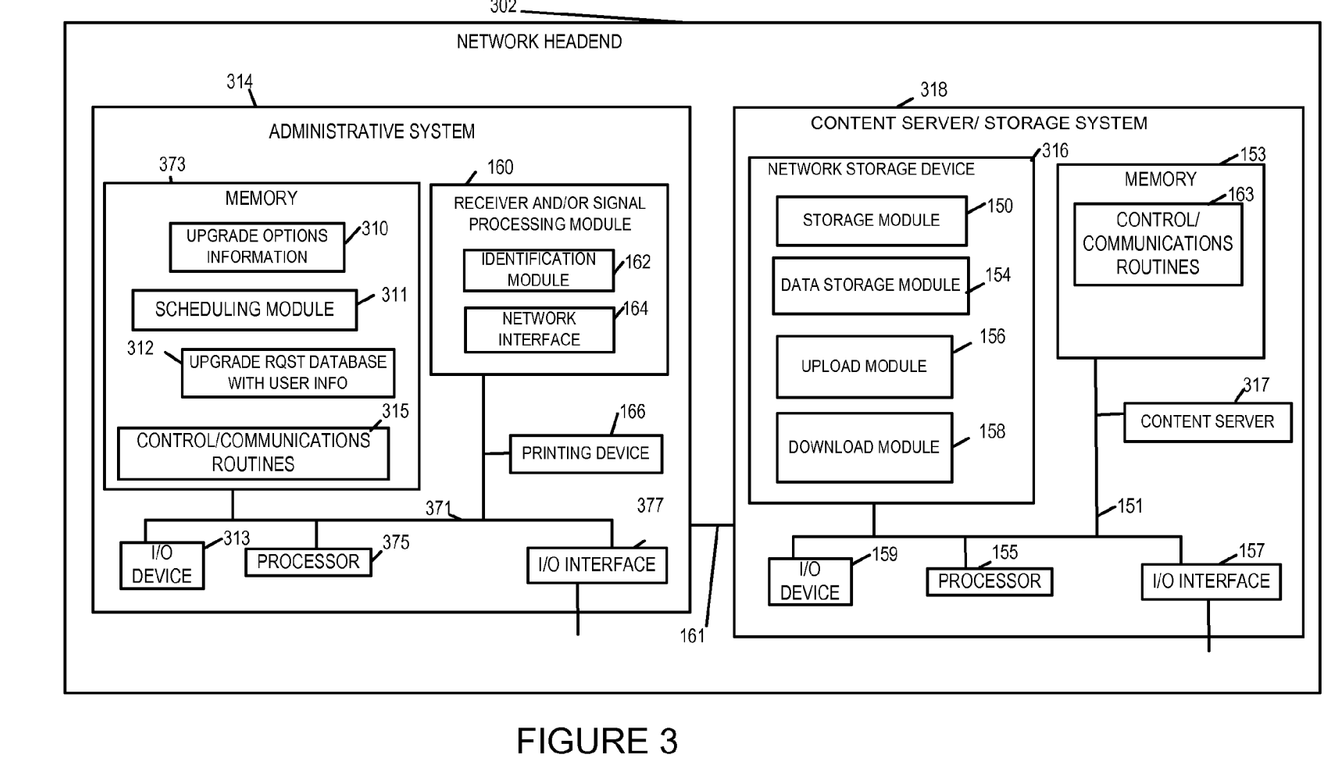
FIG. 3 is a more detailed illustration of an exemplary network headend which can be used in the system shown in FIG. 1.

FIG. 3 is a more detailed drawing of an exemplary subsystem, a network head end 302, which may be used in the communications network of FIG. 1. FIG. 3, illustrates the network headend and the relationship of various elements of the network headend in greater detail. The network head end 302 includes various elements which support and enable the service provider to perform an upgrade of a user device, e.g. a STB with recording capability, in accordance with the various embodiments of the present invention. The network headend 302 includes administrative system 314 and content server/storage system 318, optionally coupled together by a bus or network connection 161.

The administrative system 314 includes a memory 373, a receiver and/or signal processing module 160, a printing device 166, an I/O device 313, a processor 375 and an I/O (input/output) interface 377 coupled together by a bus 371.

The memory 373 includes various stored information and storage modules, e.g. such as the upgrade options information 310 which stores information regarding various available upgrade and content backup options that are being offered by the service provider. While interacting with a customer (through STB and/or telephone, web browser etc.) the administrative system 314 uses the upgrade options information 310 to present available upgrade and content backup options to the customer. The memory further includes a scheduling module 311, an upgrade request database with user information 312, and control/communications routines 315. The scheduling module 311 stores information regarding the scheduled date and time as to when a user set top box is to be upgraded and, optionally, the time at which content is to be uploaded from the old STB prior to the scheduled upgrade. The administrative system 314 stores upgrade request information including, for example, information identifying the customer who requested the upgrade, the address of the customer, the type of STB to be provided as a new STB as part of the upgrade, information identifying the old STB to be upgraded, and the scheduled date/time of the upgrade in a upgrade request database 312. The memory 373 includes control/communications routines 315 that: i) control the operation of the administrative system in accordance with the invention, ii) control the administrative system's interaction with the content server/storage system 318, and iii) implements the various communication protocols used by the administrative system 314.

The administrative system 314 includes the receiver and/or signal processing module 160 which is used for receiving and processing signals from other devices (e.g. old and/or new set top boxes). Received signals may be used to schedule an upgrade, trigger uploading of content to the content sever 318 and/or initiate downloading of content to a new STB being supplied as part of an upgrade operation. Thus, received signals may, as will be discussed further below, be used to initiate downloading of stored content uploaded from an old set top box to be upgraded. The receiver and/or signal processing module 160 includes an identification module 162 for identifying the set top box being upgraded from information, e.g., a MAC address corresponding to the old STB, included in the received signal, and a network interface 164 for receiving the signal used to initiate a download of stored content to the new set top box, via a communications network. A printing device 166, provided as part of the administrative system 314, is used, in some but not necessarily all embodiments, for printing shipping labels and return shipping labels to be used in shipping a set top box.

The processor 375 controls the operation of various elements present in the administrative system 314 by executing one or more of the stored control routines and/or modules included in the memory 373, so that these elements operate in accordance with the present invention. The I/O device 313 can be, e.g. a keypad, and may be used by, e.g., an operator for entering some information and/or command in the system 314. Via the I/O interface 377, the administrative system 314 can receive and/or send messages, content, commands etc.

The Content server/storage system 318 includes a network storage device 316, a content server module 317, a memory 153, an I/O device 159, a processor 155 and an I/O interface coupled together via a bus 151. The content server module 317, among other things, controls and manages the operation of the network storage device 316, e.g., controlling upload of content, from an old STB/DVR of a user who ordered an upgrade, to the network storage device 316 (prior to replacing the old STB/DVR of the user with a new STB/DVR) and controlling restoration/delivery of such stored content from the network storage device to the new STB/DVR after installation of the new STB/DVR.

The network storage device 316 includes a short term storage module 150, a long term data storage module 154, an upload module 156 and a download module 158. The short term data storage module 150 is used for storing video content uploaded from the set top box to be upgraded (e.g., an old STB). In some embodiments, this is done in response to, and under direction of, the receiver/and or signal processing module of the administrative system 314 or under direction of the same or similar modules in the content server/storage system 318. A signal received by the system 318 to trigger uploading may indicate that the content server is to initiate storage on the network storage device 150. The data storage module 150 stores information identifying the set top box to be upgraded. In some embodiments, the data storage module 150 also stores the video content uploaded from an old set top box which is scheduled to be upgraded. In some embodiments, the upload module 156 is responsible for initiating an automatic upload of stored video content from a set top box to be upgraded to a network storage device prior to a scheduled upgrade. The download module 158 is responsible for downloading the uploaded stored video content from the network storage device 316 to a new set top box that has replaced or will be used to replace the old set top box being upgraded.

In addition to the element already discussed, the content server/storage system 318 includes memory 153. The memory 153 includes control/communications routines 163 which control the operation of the content server/storage system 318 in accordance with the invention and implements the various communication protocols used by the system 318. The processor 155 controls the operation of various elements present in the content server/storage system 318 by executing one or more of the stored control routines included in the memory 153, so that these elements operate in accordance with the present invention. The I/O device 159 can be, e.g., a keypad, which may be used by, e.g., an operator for entering some information and/or command in the system 318. Via the I/O interface 157, the content server/storage system 314 can receive and/or send messages, content, commands etc. The I/O interfaces 377 and 157 of the administrative system 314 and content server 318 may be coupled to one another and various STBs via the cable communications network.

Various figures used to described the exemplary methods of the present invention will now be discussed. At the top of FIGS. 4A, 4B and 4C the various elements 300 of the system 100 which may participate in the signaling and establishment associated with an exemplary STB upgrade session are shown. The illustrated components 300 include network head end 302, user 1 old STB/DVR 306, user 1 new STB/DVR 306', user 1 display device 308, user communication device 304, e.g. telephone, web browser etc., installer 301 which may be the user himself or may be a service person who has been assigned the task for performing installation of STB/DVR by the service provider. Some of the elements which are part of the network head end have been shown, e.g. administrative system 314 and a content server/storage system 318.

For the purpose of various examples discussed here, it will be assumed that user 1 old STB/DVR 306 is the old STB which user 1 is to be replaced as part of an upgrade operation, and user 1 new STB/DVR 306' is the new STB with upgraded features and/or increased storage capacity that replaces the old STB/DVR. The signaling exchange between the STB's (e.g. user 1 old STB/DVR 306 or user 1 new STB/DVR 306') and the network headend 302, may and in some cases does, occur over the communications network 176, e.g. a cable network, as shown in FIG. 1.

Figure 4A:
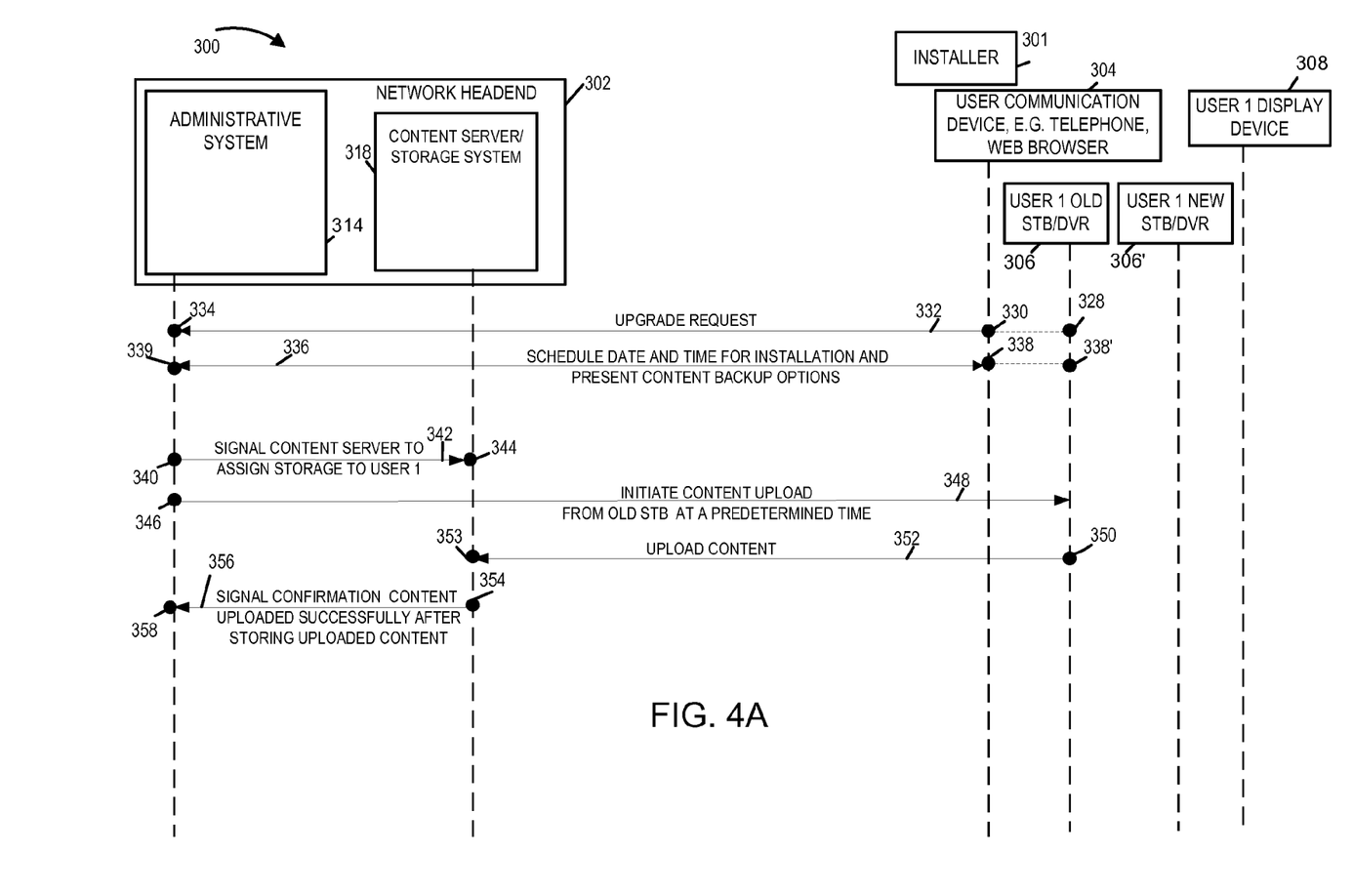
FIG. 4, which comprises the combination of FIGS. 4A and 4B, illustrates the signaling and steps associated with one exemplary method where an upgrade is performed at a scheduled time in accordance with the present invention.
Figure 4B:
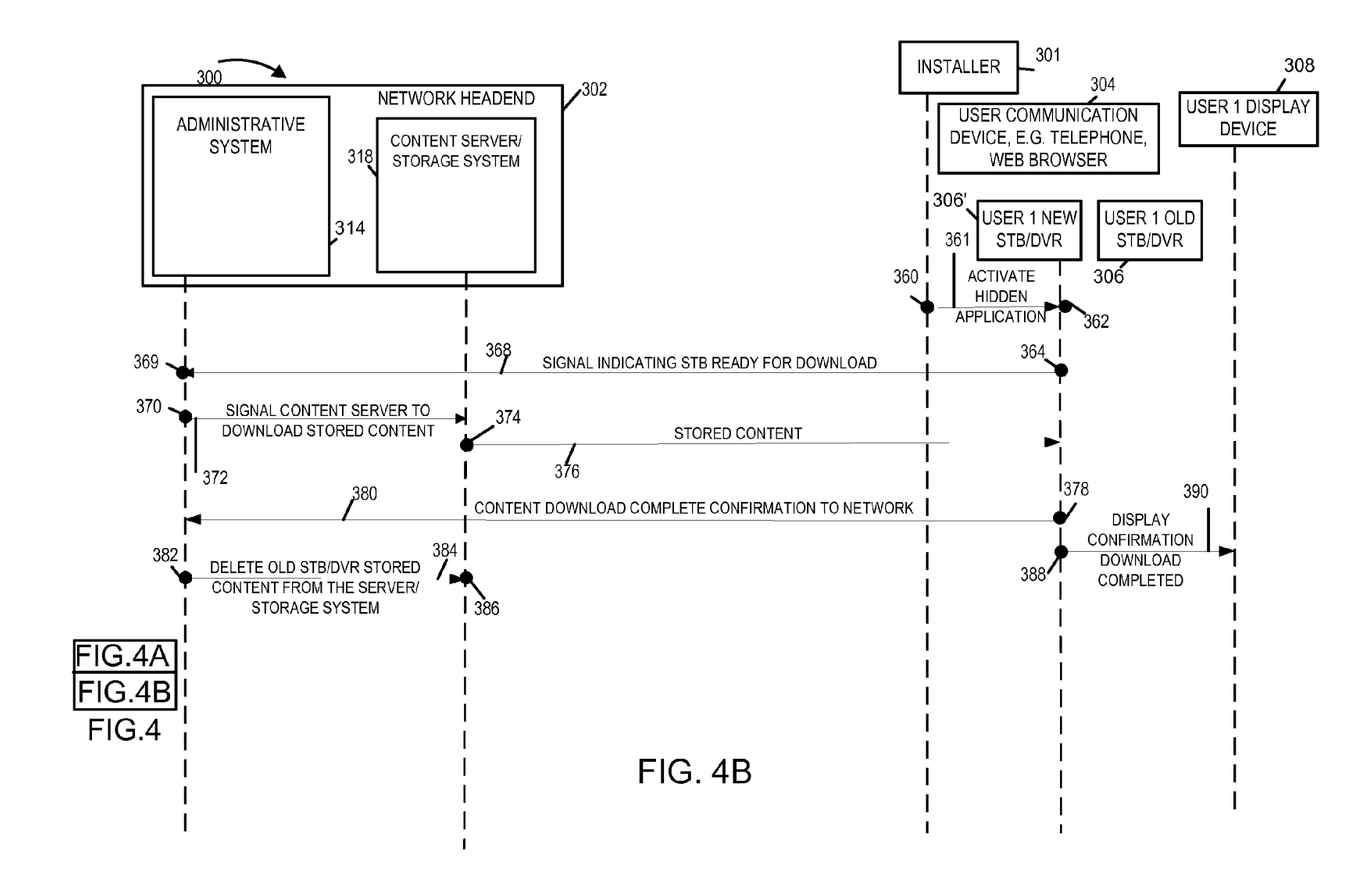

FIG. 4, which comprises the combination of FIGS. 4A and 4B, illustrates the steps and associated signaling used in one exemplary embodiment where a customer wishes to upgrade the set top box, a content upload is automatically initiated prior to the scheduled replacement, and content is downloaded to the new STB in response to a signal from the new STB. As is discussed below, in this particular example the upgrade process is initiated by a request from the user of the STB device, e.g. user of the old STB/DVR 306 but it should be appreciated that the request could be sent from another device such as the user communication device 304.

In the FIG. 4 example, in step 328, user 1, e.g., the user of old STB/DVR 306 who wishes to upgrade to a new STB/DVR with enhanced features, requests a STB upgrade which causes the old STB/DVR 306 to send a request signal 332 to the administrative scheduling system 314 in the network head end 302. Alternatively, the request for an upgrade may be made from the user communication device 304, e.g. a telephone or web browser, as shown in processing step 330 which may also generate a upgrade request signal 332. The upgrade signal may be a signal sent from a WEB browser after the user logs on to the service provider's website to make an on-line upgrade request. The request may include information identifying the user of old STB/DVR, e.g., the user account identifier, name and address of the user, and/or other information such as the MAC address of the old STB DVR or some other identifier used to identify the specific STB to be upgraded. The upgrade request signal sent from the user 1 old STB/DVR 306 to the administrative scheduling system 314 is shown using a signaling arrow 332. The request is received and processed by the administrative scheduling system 314 in step 334. While processing the request in step 334, the administrative system stores information identifying the set top box to be upgraded on the storage system 318. In response to the received request, the administrative scheduling system 314 exchanges signaling and information, indicated by arrow 336, with the device, e.g., user communication device 304 or old STB 306 from which the request is being made. Signals 336 may include information communicating the date and time for the installation of the new STB, and options available for uploading all or user selected portions of the content stored on the old STB to be upgraded. For example, the information may include options for the user that the content of STB/DVR 306 will be backed up, e.g. a night before installation of the new STB/DVR 306' or between certain hours of the night before the scheduled installation of the new STB/DVR. In accordance with one exemplary embodiment of the present invention, as shown in the example of FIG. 4, the user selects an option where the installation of the new STB/DVR 306' and restoration of the uploaded content is performed at the customer premise, e.g. home of the user of STB/DVR. After the signaling exchange between the administrative system 314 and the user of old STB/DVR 306 completes, then in step 339 the administrative system stores information indicating when the STB 306 is scheduled to be upgraded.

Next, in step 340 the administrative system, now being aware of the back up option selected by the user of old STB/DVR 306, sends a signal 342 to the content server/ storage system 318 to assign storage space for storing the content of user 1 old STB/DVR 306 so that the network will have a location to which stored content from old STB/DVR 306 can be uploaded. In step 344, the content server/storage system 318 processes this request and assigns a storage space in the network storage device 316 for backing up the content from user 1 old STB/DVR 306. Following the assignment of storage space for storing the content, the administrative system in step 346, sends signal 348 to the old STB/DVR 306 to initiate a content upload. Then, in step 350, the old STB DVR processes the received signal and in response, sends a signal 352 to indicating that a content upload is being performed by STB 306 and communicating video content stored on the old STB/DVR. The content server/storage system 318 receives the signal and the uploaded content from the old STB/DVR in step 353. In step 353 further processing takes place and the content server/storage system 318 controls the storage of the uploaded content to the network storage device 316. In step 354 the content server, after storing the content from old STB/DVR along with STB and/or customer identification information, sends a confirmation signal 356 to the administrative system confirming successful uploading of content from the old STB/DVR 306.

The method continues from FIG. 4A to FIG. 4B. For the purpose of this example, it is assumed that the new STB DVR 306' which will replace the old STB/DVR 306, is one of a plurality of new STB DVR's available to the installer from which the installer can select. Thus new STB 306 may be any one of a plurality of blank STB DVRs available to the installer. In step 360 the installer, e.g. a service professional or home owner, installs the new STB/DVR at customer premise, initializes the new STB and activates a hidden application used to download the content uploaded from the old STB. The hidden application provides a security feature to confirm that use of the hidden application is by an authorized individual. In some but not necessarily all embodiments, the activation of the hidden application may involve entry of certain codes, e.g. user account information, passwords, device identifiers, etc. provided to the authorized installer with entry of such a code or other information being required to enable the hidden application to download previously uploaded content. In step 362, the new STB DVR 306' processes this activation command and authenticates its use by an authorized user. In step 364, following activation of the hidden application, the newly installed STB/DVR 306' sends a signal 368 indicating that the new STB/DVR is now ready for download of the stored content that belongs to the user of old STB/DVR 306. The signal 368 signals the administrative system 314 to initiate download of the stored content to the new STB. In some embodiments, the signal 368 includes information identifying the old STB and/or the new STB. The device identifier may be, e.g., a MAC address of the old STB/DVR 306. In such embodiments, the administrative system may use this information to perform a look-up in the user database and match the user information to restore the content belonging to old STB/DVR 306, to the new STB/DVR 306' and/or otherwise use the received information to identify the content to be downloaded to the new STB. The administrative system receives the signal 368 in step 369 and processes it. In response to signal 368, the administrative system 314, in step 370, sends a signal 372 to the content server to cause the content server to deliver the stored content, which was uploaded from the old STB/DVR 306, to the new STB/DVR 306'. In step 374, the content server/storage system 318 processes this request from the administrative system 314 and downloads the stored content previously uploaded from the old STB/DVR 306, to the new STB/DVR 306' which replaced the old set top box.

Next, in step 378 after the complete download of the stored content, the new STB/DVR sends a confirmation signal 380 to the administrative system 314. Following the confirmation of complete download from the new STB/DVR 306', in step 382 the administrative system 314 sends a signal 384 to the content server/storage system 318 to trigger the deletion of the stored content belonging to old STB/DVR 306 from the network storage device 316. The content server/storage system 318 receives and processes this signal in step 386 and in response deletes the stored content. In some embodiments, the new STB/DVR 306', upon complete download of content from the network, may send a signal to the user display device 308 indicating completion of content download processes from the content server. This occurs in step 386 wherein the new STB/DVR 306' sends a display signal 388 to the user display device 308, e.g. a T.V or a monitor. Upon the receipt of the display signal 388, the user display device 308 may display, e.g. a message showing "Download completed successfully" or in some embodiments the display device may show download progress as the new STB/DVR 306' downloads content from the network storage device 316.

Figures 4C, 5:
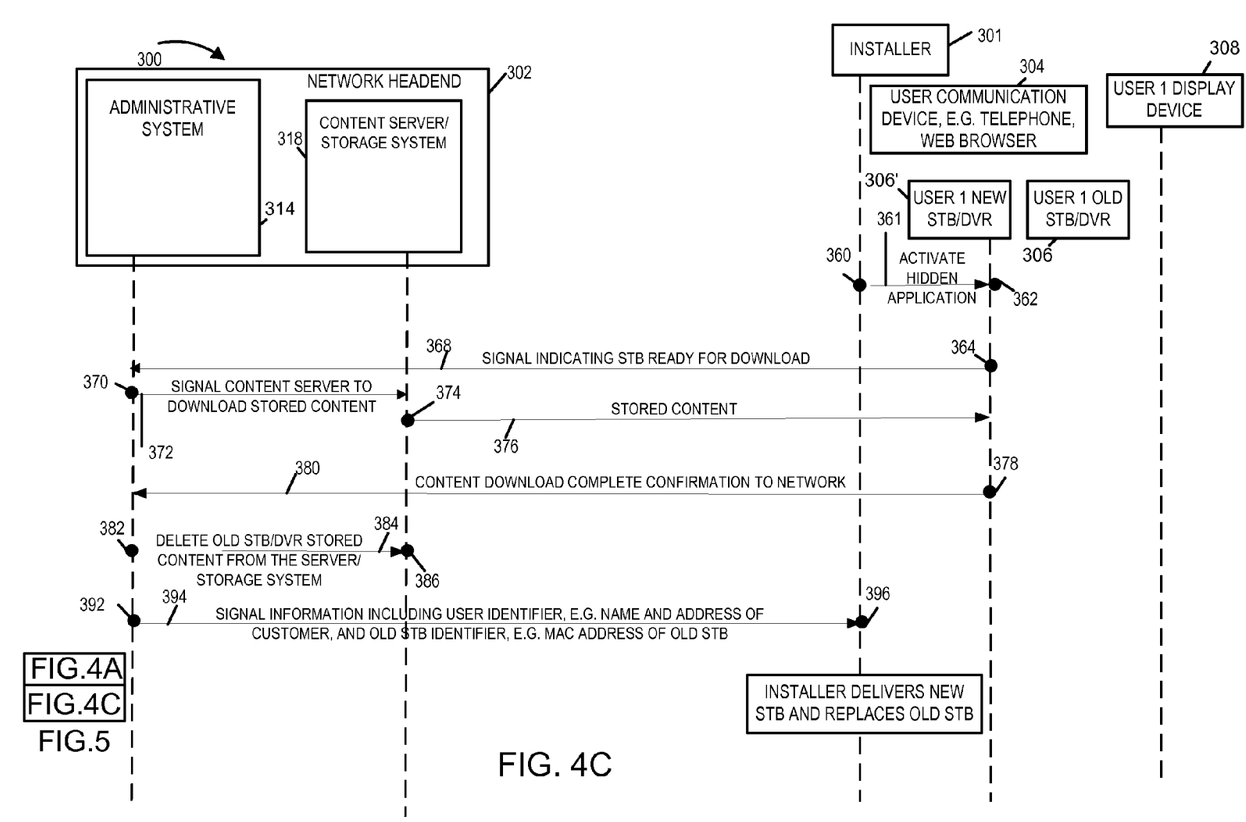
FIG. 5, which comprises the combination of FIGS. 4A and 4C, illustrates the signaling and steps associated with another exemplary method where an upgrade is performed in accordance with the present invention.

FIG. 5, which comprises the combination of FIGS. 4A and 4C, illustrates the steps and associated signaling used in another exemplary embodiment in accordance with the present invention. The processing in FIG. 4A is the same as previously described with regard to the FIG. 4 embodiment. However, the steps in FIG. 4C are performed instead of the steps of FIG. 4B. FIG. 4C includes several steps which are the same or similar to the steps and associated signaling presented in FIG. 4B. Accordingly, such steps and associated signaling will be identified in FIG. 4C using same reference numbers as used in FIG. 4B. For the sake of brevity and to avoid repetition, the steps and associated signaling shown in FIG. 4A will not be discussed in detail again since the signaling and steps have already been discussed in the example of FIG. 4 in detail.

In the FIG. 5 example, downloading of content is performed prior to delivery of the replacement STB to the customer's premises, e.g. home of the user of STB/DVR. The installer may perform the steps needed to download the stored content from the network to the new STB DVR at his/her premises and then just deliver the new STB/DVR to the user. The user and/or the installer may then just plug in the new STB/DVR at the customer premise in place of the old STB and activate it for use by customer. Using such a backup option, the installer may save a significant amount of time as compared to embodiments where the installer has to wait at the customer's premises for content to be download to the new STB. This can save additional overhead to the service provider who has to pay extra charges to installers for working offsite. Further, the customers i.e. the users may also save a lot of their time which they might have to spend, if they decide to perform installation by themselves, in downloading the content belonging to their old STB/DVR from the network.

As discussed above, a distinguishing aspect of the example of FIG. 5 is that the activation of the new STB/DVR 306' and restoration of old STB/DVR content may not be performed at customer premise. Rather the installer e.g. a person assigned the task of installing and/or activating STB/DVR's for a number of customers by the service provider, may perform majority of essential operations on the new STB/DVR before delivering it to the customer. FIG. 4C shows various steps and associated signaling, many of which are the same or similar to the steps and signaling presented in FIG. 4B. In step 360, the installer activates the hidden application on the new STB, e.g., while the new STB is located at the installer's premises. The signaling associated with this step is shown using arrow 361. Once the hidden application is activated, the new STB/DVR 306' prepares itself for the download of content from the network. In step 364, the new STB/DVR 306' signals the network administrative system that it is ready for content download as indicated by arrow 368. The signal may include information about the new STB/DVR 306', e.g. new STB/DVR identifier. In step 370, in response to signal 368, the administrative system 314, sends a signal 372 to the content server to send the stored content which was uploaded by the old STB/DVR 306, to the new STB/DVR 306'. It should be appreciated that during this period of time, the network administrative system is aware that the stored content belonging to old STB/DVR 306 is being sent to the new STB/DVR 306'. The installer may or may not be aware of what content and whose content will be downloaded to the new STB/DVR 306'. In step 374, the content server/storage system 318 processes the request from the administrative system 314 and sends the stored content belonging to the old STB/DVR 306 to the new STB/DVR 306' as shown using arrow 376.

Upon the completion of download of the content, in step 378 the new STB/DVR 306' sends a signal 380 to the network administrative system 314 confirming the complete download of the stored content belonging to old STB/DVR 306. Following the confirmation of complete download from the new STB/DVR 306', in step 382 the administrative system 314 sends a signal 384 to the content server/storage system 318 to delete the stored content belonging to old STB/DVR 306 from the network storage device 316. The content server/storage system receives and processes this signal in step 386 and in response deletes the stored content. In step 392, the network administrative system 314 sends a signal as represented by arrow 394, to the installer 301. The signal 394 includes information identifying the user, e.g., customer to which the new STB is to be delivered, e.g. name and address of the user, device identifier, e.g. MAC address of the old STB/DVR 306, etc. This information, as represented by the signal 394, may be communicated from the network administrative system 314 to the installer 301 over a cable network, through telephone, paging, E-mail etc. In step 396, the installer 301 using information communicated in signal 392, prints a label including customer identification and/or delivery information and delivers the new STB/DVR 306' to the identified customer premises. In some embodiments, the installer 301 may install and activate the new STB/DVR 306' at the customer premise. In other embodiments, the installer 301 may just deliver the new STB/DVR 306' to the customer address. The user may decide to perform installation by himself/herself.

Alternatively, in some embodiments, it may be desired that the need of an installer visiting the customer premise is removed altogether. As can be appreciated, after the download of the stored content from the old set top box, to the new set top box by the administrative system, it is not necessary that an installer needs to personally go to the customer premise and replace the old set top box with the new upgraded set top box. Rather, this can be completely avoided, thus saving additional time and cost to both, through the use of a delivery service. Such an embodiment is illustrated using the example of FIG. 6.

Figure 4D:
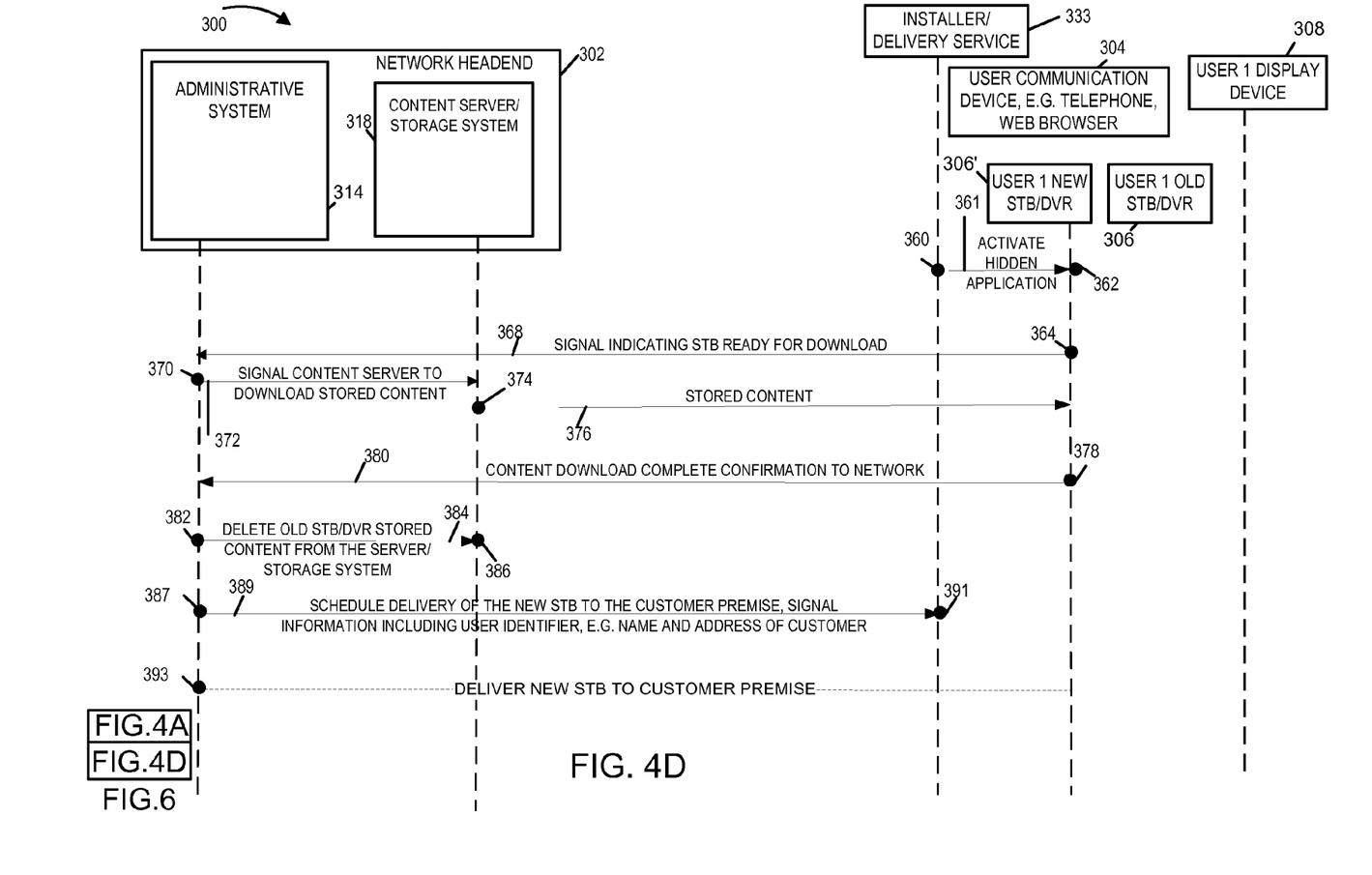

FIG. 6, which comprises the combination of FIGS. 4A and 4D, illustrates the signaling and steps associated with such an exemplary embodiment where the uploaded content is loaded onto the new upgraded STB and the new upgraded STB is then delivered/shipped to the customer for installation by the customer. Thus, any need for an installer visit to the customer premise is obviated.

FIG. 4D includes several steps which are the same or similar to the steps and associated signaling presented in FIG. 4C. Accordingly, such steps and associated signaling will be identified in FIG. 4D using same reference numbers as used in FIG. 4C. Furthermore for the sake of brevity and to avoid repetition, various steps and associated signaling shown in FIGS. 4A and 4C will not be discussed in detail again since the signaling and steps have already been discussed in detail in the example of FIG. 5 in detail. The administrative system 314 may make provisions to automatically upload the content from the old set top box (old STB/DVR) and then download the stored content back from the network to the new STB/DVR either at any location within the network headend 302, e.g. place where new STB/DVR systems are stored or tested, or at the installer premises. Once the new STB/DVR is ready with all the stored content, the administrative system then schedules the delivery of the new STB/DVR to the customer location. This may be done by automatically sending delivery signal to a delivery service, e.g., electronically, over the Internet or other network connection.

A distinguishing aspect of the example of FIG. 6 is the additional processing done at the administrative system end in order to ship the new STB/DVR to the customer after the restoration of the old STB/DVR stored content. Various steps and associated signaling involved in FIG. 4D which are common to FIG. 4D and FIG. 4C have already been discussed in earlier example, i.e. the example of FIG. 5 (for example, here steps 360 to step 386, and the signaling associated with all the steps involved, is common in FIGS. 4C and 4D). Following step 386, the administrative system prints a shipping label for the new set top box, so that it can be delivered to the customer through a delivery service. As shown in FIG. 4D, in step 387 processing is done in order to generate shipping labels for the new set top box (new STB/DVR 306'). Also generated is a return shipping label to be used for return shipment of the old set top box (old STB/DVR 306) which is to be replaced. Printing device 166 included in the administrative system is used for this purpose. The return shipping labels are printed and included along with the new set top box which is scheduled to be delivered to the customer so that the customer can easily ship back the old set top box, to the service provider. The administrative system 314 may decide to schedule the delivery of the new set top box to the customer location using a standard delivery service and/or mailing service. For this purpose, the administrative system sends a signal 389 to the installer/delivery service 333. The signal 389 includes information identifying the user of the new STB/DVR e.g. name and address of the customer etc. This information contained in the signal 389, may be communicated from the network administrative system 314 to the installer/delivery service 333 by any of a variety of communications techniques, e.g. over a cable network, through telephone, paging, E-mail etc. In step 393, the administrative system finalizes and sends the shipment to the customer through the delivery service. In some embodiments, alternatively, the administrative system 314 may engage an installer to schedule the delivery and provide the installer enough information, e.g. customer name and address etc., which is needed to deliver/ship the new set top box to the customer.

While described in the context of a video on demand system, it should be appreciated that the methods and apparatus of the present invention are not limited to the delivery of video content and can be used to support delivery of audio content and/or other types of information content which may be requested by an IP based CPE device.

In various embodiments system elements described herein are implemented using one or more modules which are used to perform the steps corresponding to one or more methods of the present invention, for example, presenting the user with available content information, receiving a user input indicating a content request, estimating delivery time information, selecting a source for content, controlling the copying of content between servers, Each step may be performed by one or more different software instructions executed by a computer processor, e.g., a central processing unit (CPU).

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of performing a set top box upgrade for a customer, the method comprising:
    storing content backup information indicating content backup options which are offered by a service provider;
    receiving a request for a set top box to be upgraded;
    making a backup decision based on an upload rate supported by the set top box to be upgraded;
    storing information indicating when the set top box is scheduled to be upgraded;
    prior to the scheduled upgrade, automatically initiating an upload of stored video content from the set top box to be upgraded to a network storage device;
    storing information identifying the set top box to be upgraded on said network storage device in addition to video content uploaded from said set top box;
    receiving a signal used to initiate a download of stored content, uploaded from said set top box to be upgraded, to said second set top box; and
    downloading the uploaded stored video content from the network storage device to a second set top box, said second set top box being used to replace said set top box to be upgraded.

2. The method of claim 1,
    wherein making a backup decision based on an upload rate includes:
    determining how much time in advance of set top box replacement to begin a content upload.

3. The method of claim 1, wherein making a backup decision includes deciding from a plurality of backup options what backup option to offer to the user of the set top box based on the content transfer rate supported by the set top box, one of said plurality of backup options including uploading of content prior to arrival of a service person at a customer premise where the set top box is located and another one of said plurality of backup options including allowing the service person to trigger, from the customers premise, the upload of content from the set top box to be upgraded.

4. The method of claim 2, wherein said signal used to initiate a download of stored content to the second set top box includes information identifying the set top box to be upgraded, said information identifying the set top box being a MAC address.

5. The method of claim 3, wherein said signal used to initiate a download of stored content is communicated over a cable network from said second set top box.

6. The method of claim 3, further comprising,
    prior to said signal used to initiate a download of stored content being received:
    activating a hidden application on said second set top box; and
    entering into said second set top box said information identifying the set top box to be upgraded.

7. The method of claim 6, wherein said hidden application is an installer application on said set top box to be upgraded.

8. The method of claim 1, further comprising: generating a label corresponding to the second set top box including information identifying the customer premise at which the set top box to be upgraded is located.

9. The method of claim 8, further comprising:
    initiating delivery of said second set top box to the customer premise at which the set top box to be upgraded is located.

10. The method of claim 9, further comprising:
    printing a return shipping label to be used in shipping the set top box to be upgraded; and
    including the printed return label with the second set top box when it is shipped to the customer premise at which the set top box to be upgraded is located.

11. The method of claim 9, wherein initiating delivery of the second set top box includes scheduling delivery of the set top box with a delivery service.

12. The method of claim 9, wherein initiating delivery of the second set top box includes scheduling an installer to deliver and install the second set top box.

13. A system for use in upgrading a set top box, the system comprising:
    memory for storing information indicating when the set top box is scheduled to be upgraded and content backup information indicating content backup options which are offered by a service provider; and
    a processor configured to:
    receive a request for the set top box to be upgraded;
    make a backup decision based on an upload rate supported by the set top box to be upgraded;
    automatically initiate an upload of stored video content from the set top box to be upgraded to a network storage device prior to the scheduled upgrade, said network storage device including a data storage device including information identifying the set top box to be upgraded and video content uploaded from said set top box;
    receive and process a signal used to initiate a download of stored content, uploaded from said set top box to be upgraded, to said second set top box; and
    download the uploaded stored video content from the network storage device to a second set top box, said second set top box being used to replace said set top box to be upgraded.

14. The system of claim 13,
   wherein said processor is further configured to determine how much time in advance of set top box replacement to begin a content upload as part of being configured to make a backup decision based on an upload rate.

15. The system of claim 13, wherein said signal used to initiate a download of stored content to the second set top box is received via a network interface via a communications network, said signal used to initiate a download of stored content to the second set top box; and
   wherein said processor is further configured to identify the set top box to be upgraded from information included in the received signal.

16. The system of claim 13, wherein said processor is further configured, as part of being configured to make a backup decision, to make a decision from a plurality of backup options what backup option to offer to the user of the set top box based on the content transfer rate supported by the set top box, one of said plurality of backup options including uploading of content prior to arrival of a service person at a customer premise where the set top box is located and another one of said plurality of backup options including allowing the service person to trigger, from the customers premise, the upload of content from the set top box to be upgraded.

17. The system of claim 15, wherein said signal used to initiate a download of stored content is communicated over a cable network from said second set top box.

18. A method of performing a set top box upgrade for a customer using a communications network, the method comprising:
   storing content backup information indicating content backup options which are offered by a service provider;
   receiving a request for a set top box to be upgraded;
   making a backup decision based on an upload rate supported by the set top box to be upgraded;
   receiving from the set top box to be upgraded, a signal used to initiate storage, on a network storage device, of video content stored on said set top box;
   storing video content uploaded from the set top box to be upgraded on a network storage device;
   receiving from a second set top box, a signal used to initiate a download of stored content uploaded from said set top box to be upgraded; and
   downloading the uploaded stored video content from the network storage device to said second set top box, said second set top box replacing, in said communications network, said set top box to be upgraded.

19. The method of claim 18,
   wherein making a backup decision based on an upload rate includes:
   determining how much time in advance of set top box replacement to begin a content upload.

20. The method of claim 18, wherein receiving a signal used to initiate a download of stored content to the second set top box includes receiving, from said second set top box, information identifying the set top box to be upgraded.

21. The method of claim 20, wherein said information identifying the set top box to be upgraded is a MAC address.

22. The method of claim 18, wherein said making a backup decision includes deciding from a plurality of backup options what backup option to offer to the user of the set top box based on the content transfer rate supported by the set top box, one of said plurality of backup options including uploading of content prior to arrival of a service person at a customer premise where the set top box is located and another one of said plurality of backup options including allowing the service person to trigger, from the customers premise, the upload of content from the set top box to be upgraded; and
   wherein said signal used to initiate a download of stored content is communicated over a cable network from said second set top box.

23. The method of claim 20, further comprising,
   prior to said signal used to initiate a download of stored content being received:
   activating a hidden application on said second set top box; and
   entering into said second set top box said information identifying the set top box to be upgraded.

24. The method of claim 23, wherein said hidden application is an installer application on said set top box to be upgraded.

25. A system for use in upgrading a set top box, the system comprising:
   memory for storing content backup information indicating content backup options which are offered by a service provider;
   a receiver configured to receive a request for a set top box to be upgraded and signals from set top boxes including a first signal used to initiate storage, on a network storage device, of video content stored on the set top box to be upgraded, and a second signal used to initiate a download of content stored on said network storage device;
   a processor configured to control the system to make a backup decision based on an upload rate supported by the set top box to be upgraded;
   a data storage device configured to store on said network storage device, in response to receipt of said first signal by said receiver, video content uploaded from the set top box to be upgraded; and
   wherein said processor is further configured to control the system to download the uploaded stored video content from the network storage device to the second set top box in response to said second signal.

26. The system of claim 25, further comprising said network storage device, said network storage device including:
   memory including information identifying the set top box to be upgraded and video content uploaded from said set top box.

27. The system of claim 26,
   wherein said receiver includes an network interface for receiving said signals from a cable network; and
   wherein said processor is further configured to determine how much time in advance of set top box replacement to begin a content upload as part of being configured to make a backup decision based on an upload rate.

28. The system of claim 25, wherein said processor is further configured, as part of being configured to control the system to make a backup decision, to make a decision from a plurality of backup options what backup option to offer to the user of the set top box based on the content transfer rate supported by the set top box, one of said plurality of backup options including uploading of content prior to arrival of a service person at a customer premise where the set top box is located and another one of said plurality of backup options including allowing the service person to trigger, from the customers premise, the upload of content from the set top box to be upgraded.

29. The system of claim 27, wherein said signal used to initiate a download of stored content is communicated over the cable network from said second set top box.

* * * * *